United States Patent
Shima (10) Patent No.: US 9,122,337 B2
(45) Date of Patent: Sep. 1, 2015

(54) INFORMATION PROCESSING TERMINAL, AND METHOD FOR CONTROLLING SAME

(75) Inventor: Yoshikazu Shima, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 13/979,800

(22) PCT Filed: Dec. 15, 2011

(86) PCT No.: PCT/JP2011/079007
§ 371 (c)(1),
(2), (4) Date: Jul. 15, 2013

(87) PCT Pub. No.: WO2012/111230
PCT Pub. Date: Aug. 23, 2012

(65) Prior Publication Data
US 2013/0335359 A1    Dec. 19, 2013

(30) Foreign Application Priority Data
Feb. 16, 2011    (JP) ................ 2011-030970

(51) Int. Cl.
*G06F 3/041* (2006.01)
*G06F 1/16* (2006.01)
(Continued)

(52) U.S. Cl.
CPC .............. *G06F 3/0412* (2013.01); *G06F 1/169* (2013.01); *G06F 1/1616* (2013.01); *G06F 1/1643* (2013.01); *G06F 1/1647* (2013.01);
(Continued)

(58) Field of Classification Search
None
See application file for complete search history.

(56) References Cited

U.S. PATENT DOCUMENTS

2009/0322689 A1* 12/2009 Kwong et al. ................ 345/173
2010/0259494 A1* 10/2010 Kii ................................ 345/173
2011/0018821 A1    1/2011 Kii

FOREIGN PATENT DOCUMENTS

EP    2241962 A2    10/2010
JP    2010-176332 A    8/2010
(Continued)

OTHER PUBLICATIONS

International Search Report for PCT/JP2011/079007, dated Mar. 6, 2012.
Communication dated Sep. 2, 2014 from the European Patent Office in counterpart application No. 11858732.8.

*Primary Examiner* — Kenneth B Lee, Jr.
(74) *Attorney, Agent, or Firm* — Sughrue Mion, PLLC (57) ABSTRACT

The present invention provides an information processing terminal that has improved operability in the vicinity of the gap between a plurality of touch panel displays. The information processing terminal has a first combination display and detector, a second combination display and detector, a detector, and a processing unit. The first combination display and detector displays an image and detects contact, and outputs first detected item of information upon detection of a contacting object making contact. The second combination display and detector displays an image and detects contact, and outputs second detected item of information upon detection of a contacting object making contact. The detector detects contact and outputs third detected item of information upon detection of a contacting object making contact. The detector is disposed in a gap between the first combination display and detector and the second combination display and detector. The processing unit carries out a processing sequence based on one or a plurality or all of the first detected item of information, the second detected item of information, and the third detected information.

21 Claims, 7 Drawing Sheets

(51) Int. Cl.
*G06F 3/0486* (2013.01)
*G06F 3/0488* (2013.01)

(52) U.S. Cl.
CPC .......... *G06F3/0486* (2013.01); *G06F 3/04883* (2013.01); *G06F 3/04886* (2013.01)

(56) References Cited

FOREIGN PATENT DOCUMENTS

| | | | |
|---|---|---|---|
| JP | 2010-250463 | A | 11/2010 |
| JP | 2010-250465 | A | 11/2010 |

* cited by examiner

INFORMATION PROCESSING TERMINAL, AND METHOD FOR CONTROLLING SAME

CROSS REFERENCE TO RELATED APPLICATIONS

This application is a National Stage of International Application No. PCT/JP2011/079007 filed Dec. 15, 2011, claiming priority based on Japanese Patent Application No. 2011-030970 filed Feb. 16, 2011, the contents of all of which are incorporated herein by reference in their entirety.

FIELD OF THE INVENTION

The present invention relates to an information processing terminal having a plurality of touch panel displays.

BACKGROUND ART

More and more information processing terminals such as mobile phone terminals, smart phones, tablet terminals, personal computers, etc. in recent years have touch panel displays. Some of these information processing terminals have two or more touch panel displays for use as a virtual large screen (see Patent document 1).

Since it is necessary that mobile devices, such as mobile phone terminals and smart phones, in particular, be of a size that ensures portability, such a device can be provided with a large screen but the device size can be effectively reduced by integrating the touch panel display with the respective device casing in which the panel display and casing are foldably coupled to each other. Mobile devices can also be provided with a large screen but the device size can be reduced by integrating the touch panel display with the respective casing in which the panel display and casing are detachably coupled to each other.

Since use of smart phones has become widespread, there are various occasions in which users are operating touch panel displays more frequently. In cold climates, in particular, the users of smart phones are expected to wear gloves. As the range of applications for smart phone becomes broader, gloves may be required to operate the smart phone. Consequently, the requirement is that the touch panel displays of smart phones be operable while the user is wearing gloves.

A high sensitivity mode electrostatic capacitance touch panel is capable of detecting an action made by a finger when the finger moves close to the touch panel without directing touching the surface of the touch panel. When such a high-sensitivity-mode electrostatic capacitance touch panel is incorporated in a touch panel display, the user can operate the touch panel display while wearing gloves.

Some high-sensitivity electrostatic capacitance touch panels are able to distinguish whether a finger has touched the touch panel surface or has become close to the touch panel surface. Such a high-sensitivity electrostatic capacitance touch panel may be used to make information processing terminals that are capable of performing more operations than information processing terminals which incorporate a touch panel display that detects only when a finger contacts the touch panel surface.

PRIOR TECHNICAL DOCUMENTS

Patent Documents

Patent document 1: JP2010-176332A

SUMMARY OF THE INVENTION

Problems to be Solved by the Invention

An information processing terminal having a plurality of touch panel displays has a gap between the touch panel displays at the joint, such as a hinge, between the casings of the touch panel displays. When the user touches the information processing terminal in the vicinity of the gap between the two touch panel displays, the information processing terminal may find it difficult to decide if the user has simultaneously touched the two touch panel displays or if the user has made a single touch action to be intermediate between the two touch panel displays.

If two touch panel displays are used to virtually provide a single large screen, then when the user slides a finger across the two touch panel displays, they become untouched at the gap. Therefore, an event in software processing is interrupted, making it difficult for the information processing terminal to judge whether the user is making a single action to slide the finger in a large stroke over the large screen or two actions to touch the two touch panel displays, respectively.

The technology disclosed in Patent document 1 is concerned with a special processing sequence in the vicinity of the gap between the two touch panel displays. According to the technology disclosed in Patent document 1, when the user slides a finger to move an object near an edge of one of the touch panel displays, the object is moved to either of the touch panel displays based on the position of the center of gravity of the object. Therefore, the object can be moved from one of the touch panel displays to the other touch panel display.

However, since the technology disclosed in Patent document 1 automatically moves the object based on the position of the center of gravity thereof, although it works well to move the object from one of the touch panel displays to the other touch panel display, it is not suitable for sliding the object successively between the two touch panel displays. If the user wants to again move the object on the touch panel display to which the object has moved, the user needs to again touch the touch panel display to which the object has moved and then slide his/her finger.

The high-sensitivity electrostatic capacitance touch panels have a wide detection area at the time a finger becomes close thereto. If there is a finger near the gap between a plurality of high-sensitivity electrostatic capacitance touch panel displays, then both touch panel displays detect pointing by the finger, resulting in the occurrence of two events. When a single touch action is made by a large finger in the vicinity of the gap between two touch panel displays, the finger tends to contact both touch panel displays at the same time, causing two events to occur. It is difficult to accurately identify whether the finger has made a single touch action or a multi-touch action or whether the finger has directly touched the surfaces of the touch panel displays or has only come close to the surfaces of the touch panel displays. Therefore, the action intended by the user is difficult to accurately recognize.

As described above, it is difficult with an information processing terminal that has a plurality of touch panel displays to accurately recognize the user's intention and to incorporate this intention into the processing sequence based an instinctual operation in the vicinity of the gap between the touch panel displays.

It is an object of the present invention to provide an information processing terminal which has improved operability in the vicinity of the gap between a plurality of touch panel displays.

Means for Carrying Out the Problems

In order to achieve the above object, there is provided in accordance with the present invention an information processing terminal comprising:

a first combination display and detector that displays an image and detects contact on a first display detection surface thereof and outputs first detected information item upon detection of a contacting object coming into contact with the first display detection surface;

a second combination display and detector that displays an image and detects contact on a second display detection surface thereof and outputs second detected information item upon detection of a contacting object coming into contact with the second display detection surface;

a detector that detects contact and outputs third detected information item upon detection of a contacting object making contact, the detector being disposed in a gap between the first display detection surface of the first combination display and detector and the second display detection surface of the second combination display and detector; and a processing unit that carries out a processing sequence based on one information item or a plurality or all information items from among the first detected information item, the second detected information item, and the third detected information item.

According to the present invention, there is also provided a method of controlling an information processing terminal including first and second combination display and detectors that display an image and detect contact on first and second display detection surfaces thereof and detect contact with the first and second display detection surfaces, and a detector that detects contact, the detector being disposed in a gap between the first display detection surface of the first combination display and detector and the second display detection surface of the second combination display and detector, comprising:

outputting first detected information item when the first combination display and detector detects contact;

outputting first detected information item when the second combination display and detector detects contact;

outputting third detected information item when the detector detects contact; and carrying out a processing sequence based on based on one information item or a plurality or all information items from among the first detected information item, the second detected information item, and the third detected information item.

According to the present invention, operability can be improved in the vicinity of the gap between combination display and detectors.

MODE FOR CARRYING OUT THE INVENTION

An exemplary embodiment of the present invention will be described in detail below with reference to the drawings.

Figure 1:
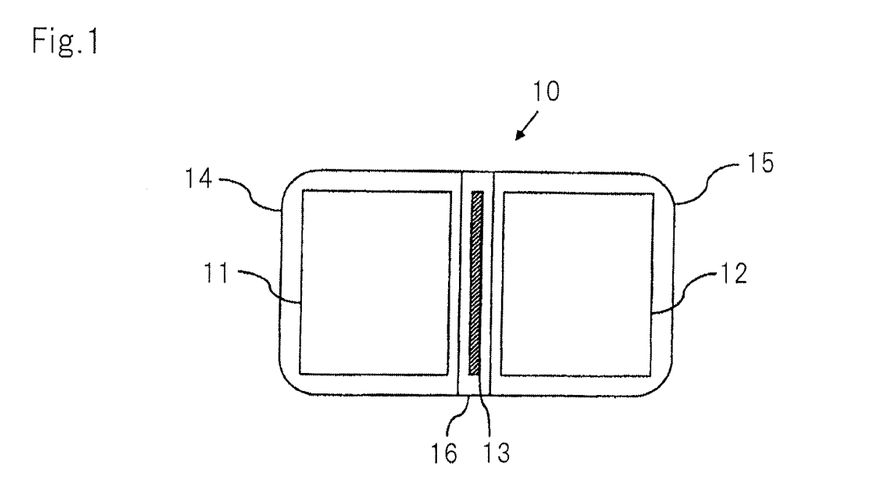
FIG. 1 is a front elevational view of an information processing terminal according to an exemplary embodiment of the present invention.

FIG. 1 is a front elevational view of an information processing terminal according to an exemplary embodiment of the present invention. Information processing terminal 10 is of a structure having two casings 14, 15 that are openably and closably coupled to each other by coupling 16 of a hinge mechanism, for example. FIG. 1 shows information processing terminal 10 in the open state.

Casing 14 houses combination display and detector 11 therein, and casing 15 houses combination display and detector 12 therein. Each of combination display and detectors 14, 12 comprises a touch panel display having a function to display an image on a display and detection surface for both display and detection, and a function to detect a contacting object, such as a finger, coming into contact with the display and detection surface.

Detector 13 is mounted on coupling 16 that is positioned in the gap between the display and detection surface of combination display and detector 11 and the display and detection surface of combination display and detector 12. Detector 13 comprises a touch panel that has a function to detect a contacting object, but does not have a display function unlike combination display and detectors 11, 12.

Figure 2:
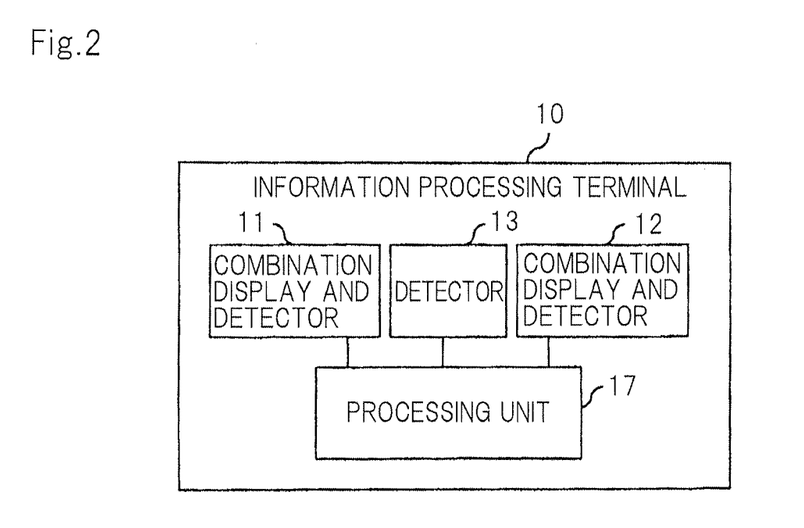
FIG. 2 is a block diagram showing a functional configuration of the information processing terminal according to the exemplary embodiment.

FIG. 2 is a block diagram showing a functional configuration of the information processing terminal according to the exemplary embodiment. As shown in FIG. 2, information processing terminal 10 includes combination display and detectors 11, 12, detector 13, and processing unit 17. Processing unit 17 comprises a processing unit that is realized when a processor executes a program, for example. Processing unit 17 carries out various processing sequences including plotting of images on combination display and detectors 11, 12 based on detected information from combination display and detectors 11, 12 and detector 13.

According to the present exemplary embodiment, combination display and detector 11 displays images and detects contact, and outputs first detected item of information when it detects a contacting object, such as a finger, making contact. Similarly, combination display and detector 12 displays images and detects contact, and outputs second detected item of information when it detects a contacting object, such as a finger, making contact.

Detector 13 is disposed on coupling 16 in the gap between the combination display and detector 11 and combination display and detector 12. Detector 13 detects contact, and outputs third detected item of information when it detects a contacting object, such as a finger, making contact.

The first through third detected information is input to processing unit 17. Processing unit 17 performs various processing sequences based on one information item from among the first detected information item, the second detected information item, and the third detected information item, or based on one information item from a plurality or all the information items. Depending on the detection by detector 13, processing unit 17 may carry out processing sequences based on one or two or three information items from among the first through the third information items.

Based on the relationship between the first and second detected item of information and the third detected item of information, processing unit 17 judges whether a touch action that is made is a single touch action for touching one place or a multi-touch action for touching combination display and detector 11 and combination display and detector 12. The single touch action is a tapping action, clicking action or sliding action with a single finger, for example. The multi touch action is a tapping action, clicking action or sliding action with a plurality of fingers, for example.

According to the present exemplary embodiment, operability can be improved in the vicinity of the gap between combination display and detectors 11, 12.

Combination display and detectors 11, 12 may output contact coordinates as detected information, and detector 13 may output detected contact as detected information.

When processing unit 17 is simultaneously supplied with first detected item of information, second detected item of information, and third detected item of information, processing unit 17 may recognize that a single touch action is made on a midpoint between the contact coordinates represented by the first detected item of information and the contact coordinates represented by the second detected item of information.

When processing unit 17 is supplied with first detected item of information representing a path followed by contact coordinates and then with second detected item of information representing a path followed by contact coordinates, if processing unit 17 is supplied with third item of detected information between the first detected item of information and the third detected item of information, then processing unit 17 may join the path represented by the first detected item of information and the path represented by the second detected item of information, and carry out processing sequences based on the joined paths.

Combination display and detectors 11, 12 may comprise various touch panels as detectors, such as an electrostatic capacitance touch sensor, a pressure touch sensor, or the like. Combination display and detectors 11, 12 may also comprise an electrostatic capacitance touch sensor having a high-sensitivity mode capable of distinguishing whether a finger has touched the touch panel surface or has come close to the touch panel surface. For example, when combination display and detectors 11, 12 detect an action in which a finger moves closer to the touch panel surface, the processing unit may judge that the user is wearing gloves, and may automatically change the logic of the operation mode to detect the touch action and the displayed size of the object, etc. on the screen. Detector 13 may also comprise various touch panels and sensors. Detector 13 may also comprise an electrostatic capacitance touch sensor having a high-sensitivity mode capable of distinguishing whether a finger has touched detector 13 of has moved close to detector 13. Detector 13 may comprise, other than an electrostatic capacitance touch panel and a pressure touch panel, a metal-type contact sensor if detector 13 needs to detect only whether there is or there is not contact, but does not need to detect coordinates.

For example, combination display and detectors 11, 12 may output first and second item of detected information capable of distinguishing between contact with a touch panel surface and being in close proximity to the touch panel surface, whereas detector 13 may output third detected item of information capable of distinguishing between contact with a touch panel surface and being in close proximity to the touch panel surface. In such a case, processing unit 17 may determine proximity when it is simultaneously supplied with first detected item of information representing proximity, second detected item of information representing proximity, and third item of detected information representing proximity.

Processing unit 17 may determine contact when it is simultaneously supplied with first detected item of information representing proximity, second item of detected information representing proximity, and third item of detected information representing contact.

Detector 13 may not necessarily be independent, but may be integrally combined with one or both of combination display and detectors 11, 12. Typically, a transparent touch panel may be superposed on combination display and detectors 11, 12 which comprise displays such as liquid crystal displays for displaying images. The transparent touch panel may be greater in size than the display surfaces of the displays, and a portion of the transparent touch panel which extends beyond the displays may serve as detector 13. With this arrangement, information processing terminal 10 has improved operability in the vicinity of the gap between combination display and detectors 11, 12 without the need for detector 13 to be separate from combination display and detectors 11, 12.

According to the present exemplary embodiment, detector 13 is mounted on coupling 16 of the hinge mechanism which interconnects two casings 14, 15. The present invention is not limited to such a structure, however. Detector 13 may be disposed in the gap between two combination display and detectors 11, 12, but not necessarily on the coupling. According to another example, the present invention is also applicable to a slide-type information processing terminal wherein two superposed casings are slidable to bring two display surfaces thereof into a juxtaposed layout when in use. If an information processing terminal has a connecting mechanism that interconnects two casings 14, 15 rotatably with respect to each other with a pivot shaft that extends perpendicularly to the display surfaces near corners of the casings, then when the two display surfaces are juxtaposed, there is no coupling in the gap between two combination display and detectors 11, 12. In this case, detector 13 may be disposed in the gap, but not the coupling.

Specific examples will be described below.

FIRST EXAMPLE

Figure 3:
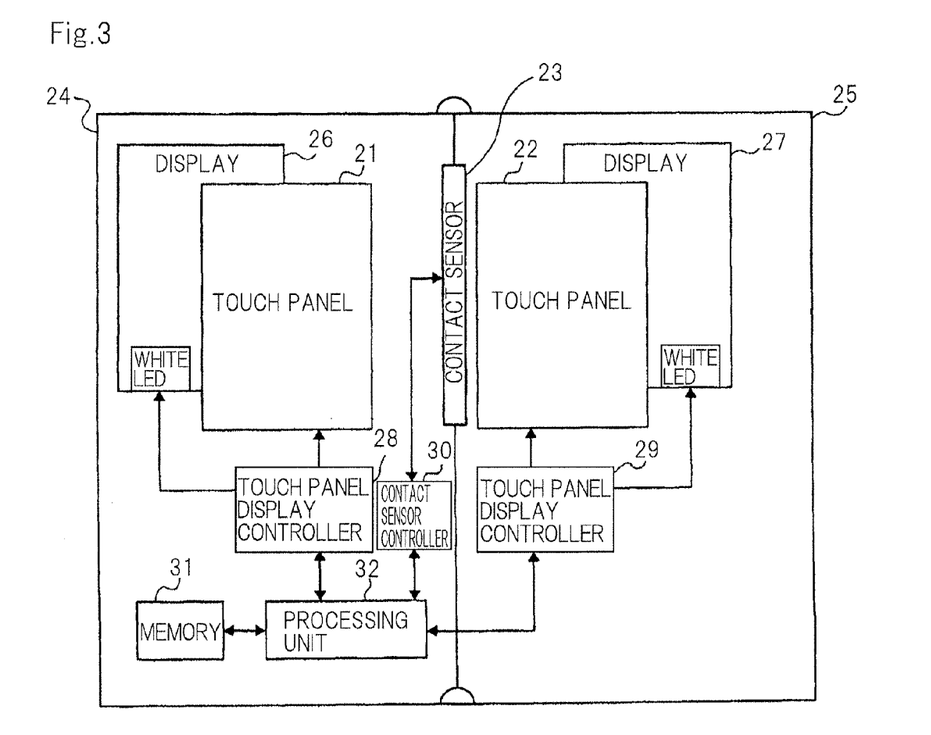
FIG. 3 is a block diagram showing a configuration of information processing terminal 10 according to a first example.

FIG. 3 is a block diagram showing a configuration of information processing terminal 10 according to a first example. The information processing terminal according to the first example includes touch panels 21, 22 as input devices, displays 26, 27 as output devices, touch panel display controllers 28, 29 for controlling displays 26, 27 and touch panels 21, 22, contact sensor 23 disposed in the gap between touch panels 21, 22, contact sensor controller 30 for controlling contact sensor 23, memory 31 for storing various items of information, and processing unit 32 for carrying out various processing sequences by executing programs. Display 26 physically underlies touch panel 21. Likewise, display 27 physically underlies touch panel 22. Display 26 and touch panel 21 are housed in casing 24, whereas display 27 and touch panel 22 are housed in casing 25.

Figure 4:
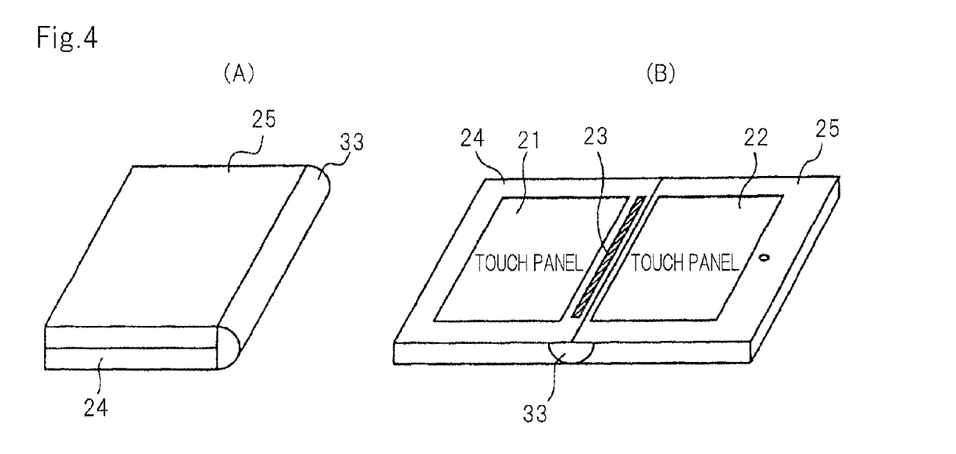
FIGS. 4(A), 4(B) are perspective views showing appearances of the information processing terminal according to the first example.

FIGS. 4(A) and 4(B) are perspective views showing appearances of the information processing terminal according to the first example. Casing 24 and casing 25 are coupled to each other by hinge 33. Casing 24 and casing 25 can be closed about hinge 33, as shown in FIG. 4(A), and can be opened about hinge 33, as shown in FIG. 4(B). When casings 24, 25 are opened, touch panel 21 comes into view on casing 24 and touch panel 22 comes into view on casing 25. Contact sensor 23 is disposed between touch panels 21, 22. Contact sensor 23 detects contacting object, such as a finger or the like, making contact.

In FIG. 3, touch panels 21, 22 detect a contacting object making contact, detect contact positions thereon, and output signals. Touch panel display controllers 28, 29 convert the signals from touch panels 21, 22 into signals to be processed, and send the converted signals to processing unit 32.

Contact sensor 23 detect a contacting object making contact, and outputs a signal. Contact sensor controller 30 converts the signal from contact sensor 23 into a signal to be processed, and sends the converted signal to processing unit 32.

Processing unit 32 is a processing unit for carrying out processing sequences based on programs and data stored in memory 31. Processing unit 32 carries out processing sequences on information that is input as signals from touch panel display controllers 28, 29 and contact sensor controller 30. Processing unit 32 displays objects, images, message texts, etc. on displays 26, 28 in response to processed results, e.g., a touch action made by a finger.

Figure 5:
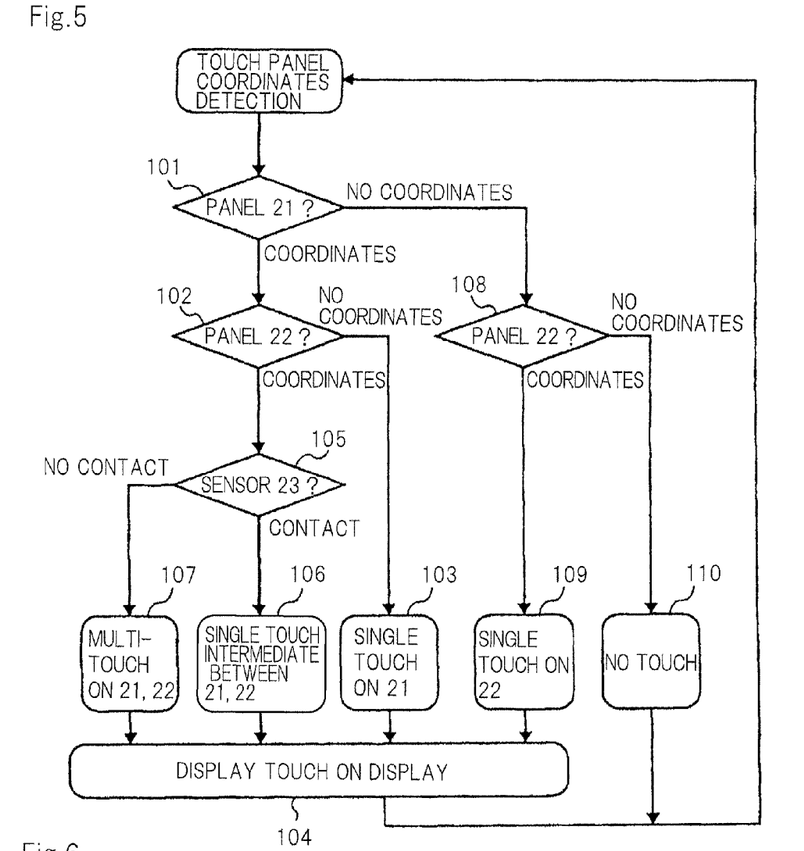
FIG. 5 is a flowchart of an operation sequence of the information processing terminal according to the first example.

FIG. 5 is a flowchart of an operation sequence of the information processing terminal according to the first example.

Processing unit 32 judges whether or not information of contact coordinates has been input from touch panel 21 (step 101). If information of contact coordinates has been input from touch panel 21, then processing unit 32 judges whether information of contact coordinates has been input from touch panel 22 (step 102). If information of contact coordinates has not been input from touch panel 22, then processing unit 32 judges a single touch on touch penal 21 (step 103), and carries out a processing sequence (step 104).

If information of contact coordinates has been input from touch panel 22 in step 102, then processing unit 32 judges whether or not information indicating contact with contact sensor 23 has been input (step 105). If information indicating contact with contact sensor 23 has been input, then processing unit 32 judges a single touch intermediate between touch panel 21 and touch panel 22 (step 106), and carries out a processing sequence (step 104).

If information indicating contact with contact sensor 23 has not been input in step 105, then processing unit 32 judges a multi-touch action on touch panel 21 and touch panel 22 (step 107), and carries out a processing sequence (step 104).

If information of contact coordinates has not been input from touch panel 21, then processing unit 32 judges whether information of contact coordinates has been input from touch panel 22 (step 108). If information of contact coordinates has been input from touch panel 22, then processing unit 32 judges a single touch on touch penal 22 (step 109), and carries out a processing sequence (step 104). If information of contact coordinates has not been input from touch panel 22, then processing unit 32 judges that no touch action has been made (step 110), and does not carry out a processing sequence.

According to the present example, contact sensor 23 disposed between touch panel 21 and touch panel 22 is used to identify whether a single contacting object has contacted both touch panel 21 and touch panel 22 (single touch) such as when the contacting object is large and touch panels 21, 22 are highly sensitive, or such as when each of the contacting objects have separately contacted touch panel 21 and touch panel 22 (multi-touch).

SECOND EXAMPLE

According to a second example, an action is made possible to draw a path across two touch panels with a contacting object such as a finger or the like.

Figure 6:
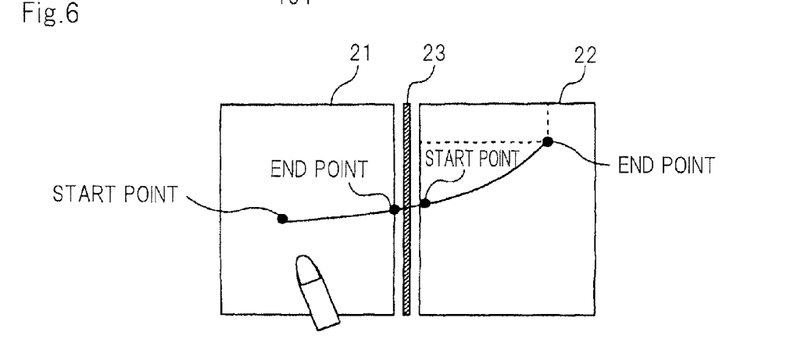
FIG. 6 is a view showing the manner in which an action is made to draw a path across two touch panel displays according to a second example.
Figure 7:
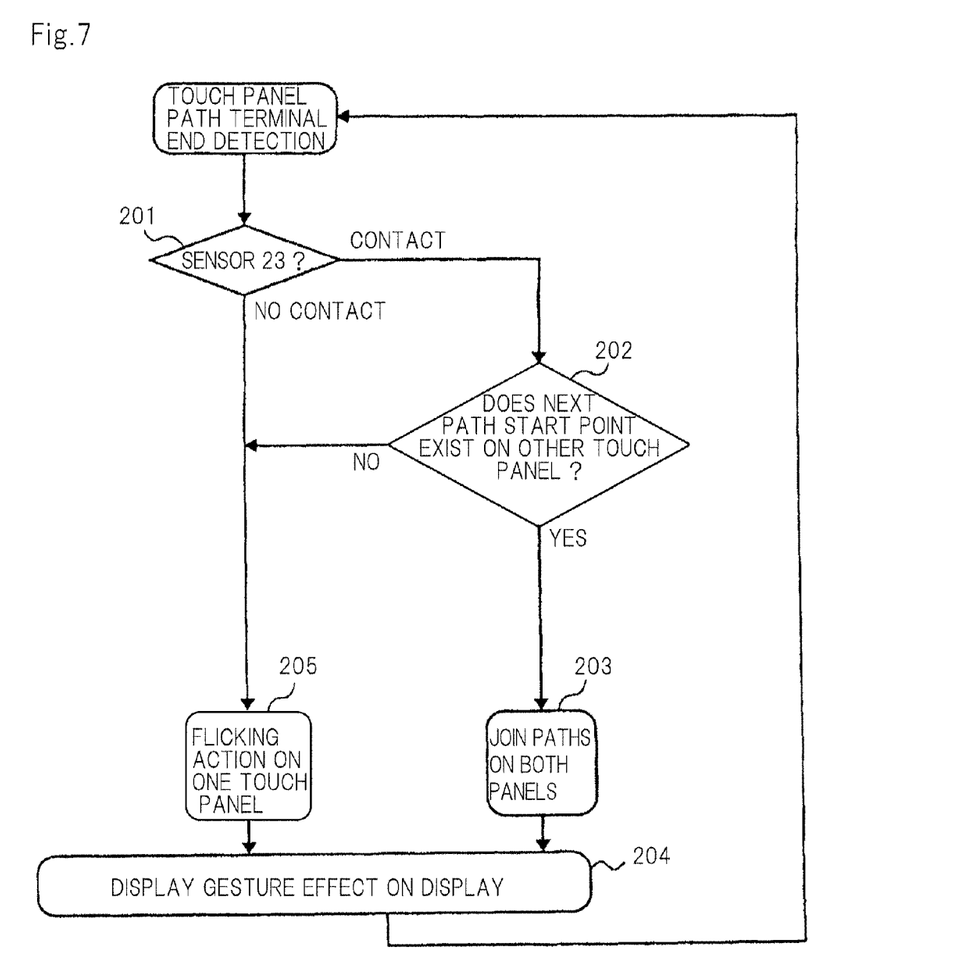
FIG. 7 is a flowchart of an operation sequence of an information processing terminal according to a second example.

An information processing terminal according to the second example has a basic configuration which is the same as the first example shown in FIGS. 3 and 4(A), 4(B). FIG. 6 is a view showing the manner in which an action is made to draw a path across two touch panel displays according to the second example. FIG. 7 is a flowchart of an operation sequence of the information processing terminal according to the second example.

When two displays 26, 27 are used as a single large screen, an action may be made to draw a path across touch panel 21 and touch panel 22. It is assumed that, as shown in FIG. 6, the user makes an action to slide his/her finger from touch panel 21 to touch panel 22, drawing a path chronologically successively across two touch panels 21, 22. The action may be used to select an object displayed on display 26 at the start point of the path, move the object from display 26 to display 27, and then complete the movement at the end point of the path. Alternatively, the action may be used to draw a path across touch panel 21 and touch panel 22, as an action to execute a gesture command for horizontally scrolling the screen.

As shown in FIG. 7, when an action is made to draw a path on one touch panel (here, touch panel 21), processing unit 32 judges whether the contacting object has contacted contact sensor 23 after the path was drawn on touch panel 21 (step 201).

If the contacting object has contacted contact sensor 23, then processing unit 32 judges whether or not the start point of the next path exists on the other touch panel (here, touch panel 22) (step 202). If the start point of a next path exists on touch panel 22, then processing unit 32 joins the paths on touch panels 21, 22 (step 203), and carries out a processing sequence (step 204).

If the contacting object has not contacted contact sensor 23 in step 201 or if the start point of the next path does not exist on touch panel 22 in step 202, then processing unit 32 judges that the action is a flicking or sliding action on one touch panel (step 205), and carries out a processing sequence (step 204).

According to the present exemplary embodiment, information processing terminal 10 is capable of properly recognizing whether a path representing a flicking action or the like is a path across touch panels 21, 22 or separate paths on respective touch panels 21, 22, and carrying out a processing sequence accordingly.

THIRD EXAMPLE

According to a third example, an information processing terminal has two high-sensitivity touch panels capable of distinguishing whether a contacting object has contacted the touch panels or has come close to the touch panels, and outputting information of coordinates where the contacting object has contacted the touch panels or has come close to the touch panels. When a contacting object such as a finger or the like is close to a touch panel, it is not in contact with the touch panel, but is in close proximity to the touch panel within a predetermined distance.

The information processing terminal according to the third example has a basic configuration which is the same as the first example shown in FIGS. 3 and 4(A), 4(B).

Figure 8:
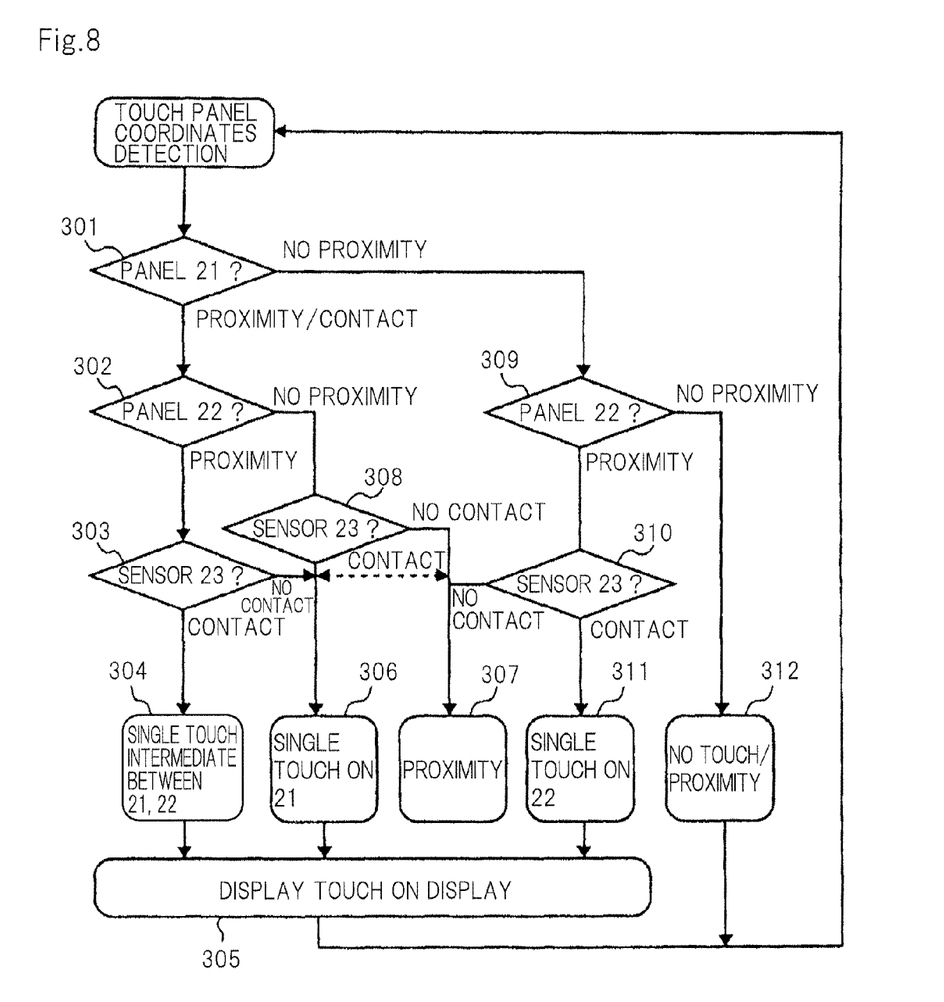
FIG. 8 is a flowchart of an operation sequence of an information processing terminal according to a third example.

FIG. 8 is a flowchart of an operation sequence of the information processing terminal according to the third example.

Processing unit 32 judges whether or not information of coordinates where a contacting object has contacted or has come close to touch panel 21 has been input from touch panel 21 (step 301). If information of contact or proximity coordinates has been input from touch panel 21, then processing unit 32 judges whether or not information of coordinates where a contacting object has come close to touch panel 22 has been input from touch panel 22 (step 302).

If information of proximity coordinates has been input from touch panel 22, then processing unit 32 judges whether or not information indicating contact has been input from contact sensor 23 (step 303). If information indicating contact with contact sensor 23 has been input, then processing unit 32 judges a single touch to be intermediate between touch panel 21 and touch panel 22 (step 304), and carries out a processing sequence (step 305).

If information indicating contact with contact sensor 23 has been input in step 303, then processing unit 32 judges contact or proximity by a single touch on touch panel 21 (step 306 or step 307) depending on the judged result from step S301, and carries out a processing sequence (step 305).

If information of proximity coordinates has not been input from touch panel 22 in step 302, then processing unit 32 judges whether or not information indicating contact has been input from contact sensor 23 (step 308). If information indicating contact with contact sensor 23 has not been input, then processing unit 32 judges contact or proximity by a single touch on touch panel 21 (step 306 or step 307) depending on the judged result from step S301, and carries out a processing sequence (step 305). If information indicating contact with contact sensor 23 has been input in step 308, then processing unit 32 judges contact of a single touch on touch panel 21 (step 306), and carries out a processing sequence (step 305).

If information of contact and proximity coordinates has not been input from touch panel 21 in step 301, then processing unit 32 judges whether or not information of proximity coordinates has been input from touch panel 22 (step 309). If information of proximity coordinates has been input from touch panel 22, then processing unit 32 judges whether or not information indicating contact with contact sensor 23 has been input (step 310).

If information indicating contact with contact sensor 23 has been input, then processing unit 32 judges a single touch on touch panel 22 (step 311), and carries out a processing sequence (step 305). If information indicating contact with contact sensor 23 has not been input, then processing unit 32 judges proximity to touch panel 22 (step 307).

If information of proximity coordinates has been input from touch panel 22 in step 309, then processing unit 32 judges that a touch action has not been made (step 301), and does not carry out a processing sequence.

According to the present exemplary embodiment, when a contacting object does not contact either of touch panels 21, 22, but contacts only contact sensor 23, the information processing terminal judges contact, and carries out a processing sequence. Therefore, the information processing terminal can properly recognize a touch action on the gap between touch panels 21, 22.

FOURTH EXAMPLE

Figure 9:
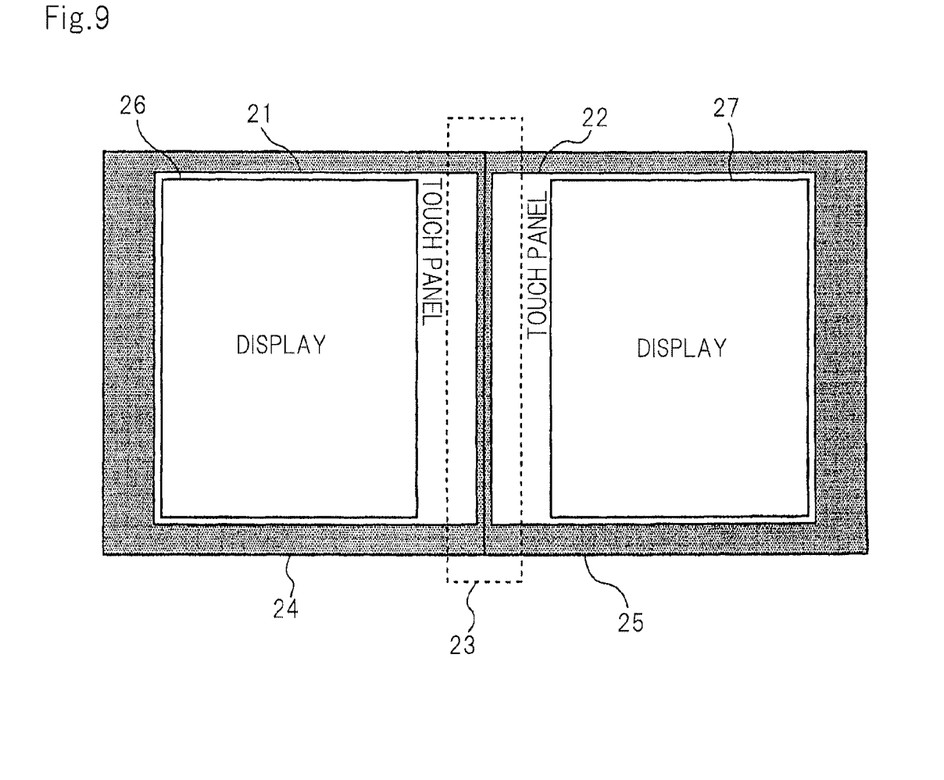
FIG. 9 is a front elevational view of an information processing terminal according to a fourth example.

FIG. 9 is a front elevational view of an information processing terminal according to a fourth example. According to the fourth example, touch panels 21, 22 and a portion corresponding to contact sensor 23 are integrally combined with each other.

Since a display device such as a liquid crystal display device has a thickness and an outer peripheral frame, even if casing 24 and casing 25 are disposed in the vicinity of each other, it is difficult to keep the display areas of display 26 and display 27 close to each other. However, if casing 24 and casing 25 are disposed in the vicinity of each other, then it is possible to make the distance between touch panel 21 and touch panel 22 smaller than the distance between display 26 and display 27.

According to the present example, as shown in FIG. 9, touch panels 21, 22 are of a size that is greater than displays 26, 27, and a portion that is capable of detecting a touch action on touch panels 21, 22, but not displaying images, is disposed between displays 26, 27. This portion is used as contact sensor 23. According to the present example, as a result, there is essentially no gap between touch panel 21 and touch panel 22.

Figure 10:
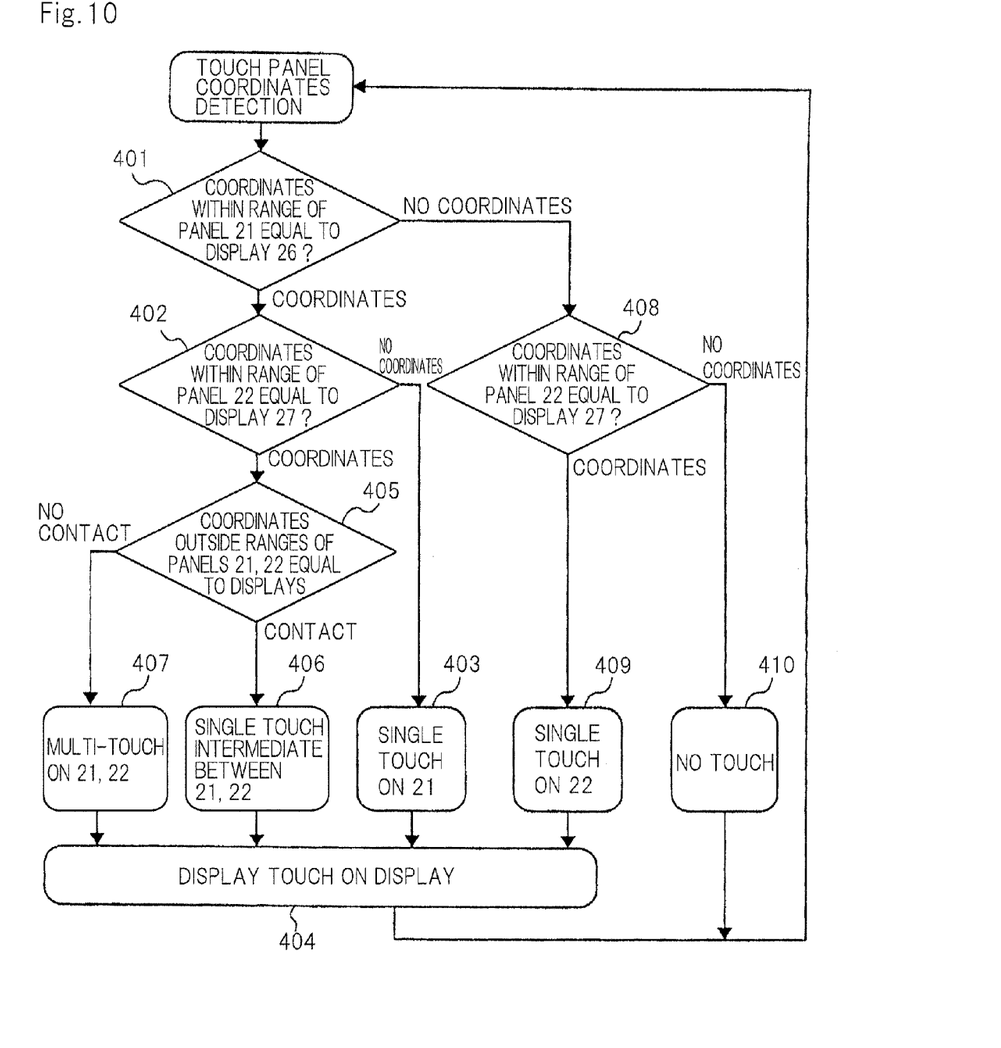
FIG. 10 is a flowchart of an operation sequence of the information processing terminal according to the fourth example.

FIG. 10 is a flowchart of an operation sequence of the information processing terminal according to the fourth example.

Processing unit 32 judges whether or not information of contact coordinates within a range of touch panel 21 which is equal to display 26 has been input (step 401). If information of contact coordinates within a range of touch panel 21 which is equal to display 26 has been input, then processing unit 32 judges whether or not information of contact coordinates within a range of touch panel 22 which is equal to display 27 has been input (step 402). If information of contact coordinates within a range of touch panel 22 which is equal to display 27 has not been input, then processing unit 32 judges a single touch on touch penal 21 (step 403), and carries out a processing sequence (step 404).

If information of contact coordinates within a range of touch panel 22 which is equal to display 27 has been input in step 402, then processing unit 32 judges whether or not information of contact coordinates outside ranges of touch panels 21, 22 which are equal to displays 26, 27 has been input (step 405). If information indicating contact with contact sensor 23 has been input, then processing unit 32 judges a single touch intermediate between touch panel 21 and touch panel 22 (step 406), and carries out a processing sequence (step 404).

If information indicating contact with contact sensor 23 has not been input in step 405, then processing unit 32 judges a multi-touch action on touch panel 21 and touch panel 22 (step 407), and carries out a processing sequence (step 404).

If information of contact coordinates within a range of touch panel 21, which is equal to display 26 has not been input in step 401, then processing unit 32 judges whether or not information of contact coordinates within a range of touch panel 22, which is equal to display 27, has been input (step 408). If information of contact coordinates within a range of touch panel 22 which is equal to display 27 has not been input, then processing unit 32 judges that no touch action has been made (step 410), and does not carry out a processing sequence.

According to the present example, the information processing terminal offers the same advantages as the first example even though it lacks physically independent contact sensor 23.

According to the above example, since contact sensor 23 disposed in the gap between displays 26, 27 does not need to output contact coordinates, it may typically comprise a metal plate. However, the present invention is not limited to a metal plate. According to another example, contact sensor 23 may comprise a pressure sensor or an electrostatic capacitance touch sensor. A pressure sensor is preferable if the user operates the information processing terminal while wearing gloves, and a metal contact sensor is preferable if the user operates the information processing terminal with his/her bare hands.

Contact sensor 23 may comprise a sensor capable of outputting contact coordinates, and processing unit 32 may carry out processing sequences based on information of coordinates from touch panels 21, 22 and information of coordinates from contact sensor 23.

The present invention has been described above with respect to an exemplary embodiment and examples thereof. However, the present invention is not limited to the above exemplary embodiment and examples. The exemplary embodiment and examples may be combined and changes and modifications may be made to some of the arrangements thereof within the technical scope of the present invention.

This application is based upon and claims the benefit of priority from Japanese Patent Application No. 2011-030970 filed on Feb. 16, 2011, the entire disclosure of which is incorporated herein by reference.

DESCRIPTION OF REFERENCE NUMERALS 10 information processing terminal
11 combination display and detector
12 combination display and detector
13 detector
14, 15 casing
16 coupling
17 processing unit
21, 22 touch panel
23 contact sensor
24, 25 casing
26, 27 display
28 touch panel display controller
30 contact sensor controller
32 processing unit
33 hinge

The invention claimed is:

1. An information processing terminal comprising:
a first combination display and detector configured to display an image and to detect contact on a first display detection surface thereof and to output first detected item of information upon detection of a contacting object coming into contact with said first display detection surface;
a second combination display and detector configured to display an image and to detect contact on a second display detection surface thereof and to output second detected item of information upon detection of a contacting object coming into contact with said second display detection surface;
a detector configured to detect contact and to output third detected item of information upon detection of a contacting object making contact, said detector being disposed in a gap between said first display detection surface of said first combination display and detector and said second display detection surface of said second combination display and detector; and
a processing unit configured to carry out a processing sequence based on one or a plurality or all of said first detected item of information, said second detected item of information, and said third detected item of information, wherein
an operation mode of the information processing terminal is changeable according to a detection of any of a plurality of contacting objects respectively.

2. The information processing terminal according to claim 1, wherein said processing unit is further configured to judge whether an action made on the information processing terminal is a single touch action or a multi-touch action based on the relationship between the first and second detected item of information and said third detected item of information.

3. The information processing terminal according to claim 1, wherein said first combination display and detector is further configured to output contact coordinates on said first display detection surface as said first detected item of information, said second combination display and detector are further configured to output contact coordinates on said second display detection surface as said second detected item of information, and said detector is further configured to output detected contact as said third detected item of information.

4. The information processing terminal according to claim 3, wherein when said processing unit is configured to be simultaneously supplied with said first detected item of information, said second detected item of information, and said third detected item of information, said processing unit is further configured to recognize a single touch action on a midpoint between the contact coordinates represented by said first detected item of information and the contact coordinates represented by said second detected item of information.

5. The information processing terminal according to claim 3, wherein when said processing unit is configured to be supplied with the first detected item of information representing a path followed by the contact coordinates, then with the third detected information, and further with the second detected item of information representing a path followed by the contact coordinates, said processing unit is further configured to join the path represented by said first detected item of information and the path represented by said second detected item of information.

6. The information processing terminal according to claim 1, wherein said first combination display and detector is further configured to output said first detected item of information which is capable of distinguishing between said contacting object coming into contact with said first display detection surface, and said contacting object being in (close) proximity to said first display detection surface;
said second combination display and detector is further configured to output said second detected item of information which is capable of distinguishing between said contacting object coming into contact with said second display detection surface, and said contacting object being in (close) proximity to said second display detection surface;
said detector is further configured to output said third detected item of information which is capable of distinguishing between said contacting object making contact and said contacting object being in (close) proximity; and
said processing unit is further configured to judge proximity when simultaneously supplied with the first detected item of information representing proximity, the second detected information representing proximity, and the third detected item of information representing proximity, and to judge contact when simultaneously supplied with the first detected item of information representing proximity, the second detected item of information representing proximity, and the third detected item of information representing contact.

7. The information processing terminal according to claim 1, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

8. The information processing terminal according to claim 2, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

9. The information processing terminal according to claim 3, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

10. The information processing terminal according to claim 4, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

11. The information processing terminal according to claim 5, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

12. The information processing terminal according to claim 6, wherein at least one of said first combination display and detector is of a structure having a display and a transparent touch panel superposed thereon, said transparent touch panel is greater in size than a display surface of said display, and said transparent touch panel has a portion extending beyond said display and serving as said detector.

13. A method of controlling an information processing terminal including first and second combination display and detectors that display an image and detect contact on first and second display detection surfaces thereof and detect contact with the first and second display detection surfaces, and a detector that detects contact, said detector being disposed in a gap between the first display detection surface of the first combination display and detector and the second display detection surface of the second combination display and detector, comprising:
  outputting first detected item of information when said first combination display and detector detects contact;
  outputting first detected item of information when said second combination display and detector detects contact;
  outputting third detected item of information when said detector detects contact;
  carrying out a processing sequence based on one information item or a plurality or all information items from among the first detected information item, the second detected information item, and the third detected information item, and
  changing an operation mode of the information processing terminal according to a detection of a plurality of contacting objects respectively.

14. The method of controlling an information processing terminal according to claim 13, comprising:
  judging whether an action made on the information processing terminal is a single touch action or a multi-touch action based on the relationship between the first and second detected item of information and said third detected item of information.

15. The method of controlling an information processing terminal according to claim 13, wherein
  said first combination display and detector outputs contact coordinates on said first display detection surface as said first detected item of information, said second combination display and detector outputs contact coordinates on said second display detection surface as said second detected item of information, and said detector outputs detected contact as said third detected item of information;
  said method further comprising, when said first detected item of information, said second detected item of information, and said third detected item of information are simultaneously output, recognizing a single touch action on a midpoint between the contact coordinates represented by said first detected item of information and the contact coordinates represented by said second detected item of information.

16. The method of controlling an information processing terminal according to claim 13, wherein
  said first combination display and detector outputs contact coordinates on said first display detection surface as said first detected item of information, said second combination display and detector outputs contact coordinates on said second display detection surface as said second detected item of information, and said detector outputs detected contact as said third detected item of information;
  said method further comprising, when the first detected item of information representing a path followed by contact coordinates is output and then the second detected item of information representing a path followed by contact coordinates is output, if the third detected item of information is output between said first detected item of information and said second item of detected information, joining the path represented by said first detected item of information and the path represented by said second detected item of information.

17. The method of controlling an information processing terminal according to claim 13, wherein
  said first combination display and detector outputs said first detected item of information which is capable of distinguishing between said contacting object coming into contact with said first display detection surface, and said contacting object being in (close) proximity to said first display detection surface, said second combination display and detector outputs said second detected item of information which is capable of distinguishing between said contacting object coming into contact with said second display detection surface, and said contacting object being in (close) proximity to said second display detection surface, and said detector outputs said third detected item of information which is capable of distinguishing between said contacting object making contact and said contacting object being in (close) proximity;
  said method further comprising:
  judging proximity when the first detected item of information representing proximity, the second detected item of information representing proximity, and the third detected item of information representing proximity are simultaneously output; and
  judging contact when the first detected item of information representing proximity, the second detected item of information representing proximity, and the third detected item of information representing contact are simultaneously output.

18. The information processing terminal according to claim 1, wherein a change of the operation mode includes a change of sensitivity to electrostatic capacitance.

19. The information processing terminal according to claim 1, wherein the operation mode is changeable according to a detection of gloves.

20. The information processing terminal according to claim 19, wherein the gloves are not touch-screen gloves.

21. The information processing terminal according to claim 1, wherein a distance between the detector of the first combination display and detector and the detector of the second combination display and detector is less than the distance between the display of the first combination display and the display of the second combination display and detector.

* * * * *